(12) United States Patent
Williams et al.

(10) Patent No.: US 7,089,133 B1
(45) Date of Patent: Aug. 8, 2006

(54) METHOD AND CIRCUIT FOR PROVIDING A SYSTEM LEVEL RESET FUNCTION FOR AN ELECTRONIC DEVICE

(75) Inventors: Timothy Williams, Bellevue, WA (US); Harold Kutz, Snoqualmie, WA (US); Eric Blom, Lynnwood, WA (US); Warren Snyder, Snohomish, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 10/942,523

(22) Filed: Sep. 15, 2004

Related U.S. Application Data

(60) Provisional application No. 60/503,571, filed on Sep. 16, 2003.

(51) Int. Cl.
*G06F 19/00* (2006.01)
*G06F 1/24* (2006.01)
(52) U.S. Cl. ............ 702/87; 327/143; 713/340; 713/500; 714/22; 702/85
(58) Field of Classification Search ............ 702/85, 702/87, 88, 101; 327/143; 713/340, 500; 714/22
See application file for complete search history.

(56) References Cited

U.S. PATENT DOCUMENTS 5,564,010 A * 10/1996 Henry et al. ............ 714/22
5,850,156 A * 12/1998 Wittman ............ 327/143
6,141,764 A * 10/2000 Ezell ............ 713/340

* cited by examiner

*Primary Examiner*—Bryan Bui
*Assistant Examiner*—John Le

(57) ABSTRACT

A method and circuit provide a system level reset function for an electronic device. An initial reset function is provided under a low voltage condition of supply voltage, such as occur upon first energizing the electronic device. A tunable reset function is also provided, which can first be asserted at a voltage level setting less precise than that setting becomes upon tuning. Further, a boot-up reset function is provided, which provides its reset function at a voltage level setting that is set according to a calibration. Calibration can be based on data stored in a non-volatile memory, and can involve a checksum operation. The electronic device, a microcontroller for instance, is held in a reset state with any of the initial, tunable, and boot-up reset functions.

20 Claims, 5 Drawing Sheets

METHOD AND CIRCUIT FOR PROVIDING A SYSTEM LEVEL RESET FUNCTION FOR AN ELECTRONIC DEVICE

RELATED U.S. APPLICATIONS

This application claims priority to U.S. Provisional Patent Application Ser. No. 60/503,571 filed on Sep. 16, 2003, by Timothy Williams, et al., entitled "System Level Reset Method," and assigned to the assignee of the present application.

This application is related to the following co-pending United States patent applications, which are incorporated herein by reference in their entirety: Ser. No. 09/887,955 by Harold Kutz, et al., entitled "Novel Power On Reset Circuit for a Microcontroller," and Ser. No. 09/887,923 by Harold Kutz, et al., entitled "Novel Method and System for Interaction Between a Processor and a Power On Reset Circuit to Dynamically Control Power States in a Microcontroller," both of which were filed on Jun. 22, 2001, and Ser. No. 10/033,027 by Warren Snyder, entitled "Programmable Microcontroller Architecture," which was filed on Oct. 22, 2001. These applications are assigned to the assignee of the present application.

TECHNICAL FIELD

The present invention relates generally to electronic circuits. More particularly, embodiments of the present invention relate to a method and circuit for providing a system level reset function for an electronic device.

BACKGROUND

It is generally beneficial for electronic devices such as integrated circuits (IC) to function within expected operating modes, e.g., for which they were designed. For many electronic devices, it is important that they do not inadvertently enter an unexpected mode of operation. Certain voltage profiles, particularly at power-up, can cause an electronic device to enter an undesired mode of operation. In extreme cases, such operation may cause permanent damage to the device, for instance, through excessive current flow resultant from the operation at lower voltage.

Devices that contain re-programmable memory (such as Flash-based microcontrollers) and other particularly voltage sensitive components may enter an unintended mode where memory contents are altered so that proper future operation is disturbed or not possible. As it is generally desirable to provide a wide voltage range where operation is allowed, devices may require internal blocks or similar components to operate at supply voltage limits. For instance, such blocks may be needed where a voltage source provides very little margin for safe, guaranteed operation. If the device is operated outside of the specified range, erroneous operation may occur, perhaps even damage.

Exemplary voltage levels 100 relevant to this discussion are shown in FIG. 1, which reflects no particular scale. A minimum voltage V0 is required for operation of any components of a device. While the minimum voltage specified for operating a device is shown by voltage V3, a margin Mo exists below it wherein the device will continue to perform reliably. Below voltage V2 however, unreliable performance may be expected. Where the supply voltage to the device (e.g., Vcc, Vdd, etc.) is below V2 yet sufficient, e.g., above voltage V1, to perform certain minimal functions therein components of the device may function to keep the device in a reset mode.

Holding the device in a reset mode can thus deter improper operation. A reset threshold tolerance band Br thus exists between voltage levels V1 and V2. A margin Mr exists above V0 and below V1, above which the device can effectively be held in reset. In some modern microelectronic devices, for instance, microcontrollers, flash memories, and other such devices, the magnitude of the difference between such voltages, for instance even between V3 and V0, can be very small, e.g., on the order of fractions of a Volt or smaller.

One conventional approach to this issue is the use of a power-on-reset (POR) circuit to provide the reset functions. FIG. 2 depicts an exemplary POR circuit 200, typifying this conventional approach. Resistors 201 and 202 divide the supply voltage Vcc to provide a bias voltage Vg to the gate of transistor 203, e.g., effectively sensing the magnitude of Vcc. Transistor 203 operates with resistor 204 to provide an input to amplifier 205 based on the magnitude of Vcc. Amplifier 205 provides a reset signal R corresponding to this input, e.g., where Vcc is below V2 (and e.g., above V1).

POR circuits such as POR circuit 200 are common components in many modern electronic devices or systems. However, because their function entails reliable reset operation during low voltage conditions (e.g., below V2) and such precision is difficult to implement or achieve at such voltages, the reset functions they provide may lack precision, relative to other circuitry. For instance, some conventional POR circuits have tolerances that are on the order of ±20%.

Thus, where circuit 200 is implemented in an integrated circuit (IC), its trip point for generating its reset signal R may vary, e.g., from approximately 1.4 V to approximately 2.1 V over normal process and temperature (PT) variations. Such a degree of POR circuit imprecision has the undesirable consequence of restricting the voltage range in which the IC or other device is operated and various approaches have been used to attempt to remedy this.

One conventional approach to POR circuit imprecision relies on external components performing a supervisory function (e.g., supervisory components) to monitor system voltage and provide reset signaling where insufficient voltage is present, for instance when low voltage conditions occur (e.g., voltage is below V2). However, such supervisory components typically use special sensing circuits, some implemented using costly technology, to achieve precision monitoring. Further, the external supervisory circuits consume space and conductor availability on the circuit board housing them (and e.g., the IC with the POR circuit), which may be at a premium, and require electrical connections that can introduce negative heating and reliability effects.

Integrating voltage sensing precision into a device that itself may be inherently low-precision can sometimes reduce overall system costs. Thus, another conventional approach uses any of various trimming or tuning methods to achieve acceptable voltage monitoring circuit precision. However, this approach can be expensive in terms of manufacturing costs, because special circuits may be needed to implement it. The approach can also be expensive in terms of processing because, for instance in ICs, processing resources are typically demanded to provide the trimming/tuning functionality.

Moreover, the trimming or tuning may occur in some devices only once they have powered up, such as where trim and/or tune values, stored for instance in the device nonvolatile memory, are used to facilitate the trimming/tuning. While such tuning may indeed bring a part's reset threshold detection to the desired precision, during the time before the precision tuning has been applied, the device remains exposed to potentially deleterious voltage. Under low voltage conditions or with an unfavorable voltage supply profile, retrieving and/or implementing the needed calibration settings may not be by entirely reliable; it may for instance be at risk of error.

Yet another conventional approach uses a relatively imprecise power-on reset circuit along with a more precise voltage monitoring reset circuit. In one such implementation, a voltage comparator with a reference voltage source is used. Using such an approach, the uncertainty in the trip threshold can be reduced as low as approximately five percent. Without special trimming methods however, it can be difficult to place the low voltage reset (e.g., trip) levels of such a device to allow both reset-free operation over an intended voltage range, and yet assert reset before faulty operation occurs, when voltage leaves the allowed voltage range. Further, conventional retrieval and implementation of reset calibration settings can be subject to error in the presence of unfavorable voltage supply profiles.

SUMMARY

Deterring faulty, improper operation of an electronic device, such as a microcontroller, a flash or other non-volatile memory device, a device using such a memory, etc. at unfavorable supply voltages is desired. Deterring data corruption and damage to the electronic device at unfavorable supply voltages is also desired. Further, providing each such deterrence over a wide range of supply voltage profiles is desired.

A method and circuit that provide a system level reset function for an electronic device are disclosed. The method and circuit each deter faulty, improper operation of an electronic device. The method and circuit each also deter corruption and damage to the electronic device at unfavorable supply voltages. Further, the method and circuit each provide each such deterrence over a wide range of supply voltage profiles.

In one embodiment, a method provides the system level reset function for the electronic device. An initial reset function is provided under a low voltage condition of supply voltage, such as occur upon first energizing the electronic device. A tunable reset function is also provided, which can first be asserted at a voltage level setting less precise than that setting becomes upon tuning. Tuning involves, in one embodiment, comparison of the supply voltage to a reference voltage source, e.g., where the supply voltage has reached a level sufficient to reliably energize the reference voltage. Further, a boot-up reset function is provided, which provides its reset function at a voltage level setting that is set according to a calibration. Calibration is based, in one embodiment, on data stored in flash or other non-volatile memory. In one embodiment, the calibration involves a checksum operation. The electronic device, a microcontroller for instance, is held in a reset state with any of the initial, tunable, and boot-up reset functions.

DETAILED DESCRIPTION

Figure 1:
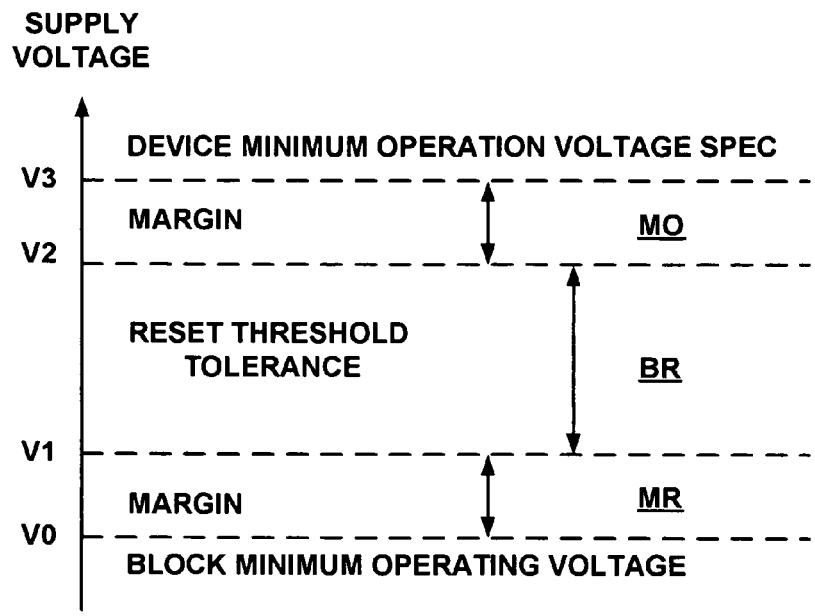
FIG. 1 depicts voltage levels relevant to operation of a typical electronic device.
Figure 2:
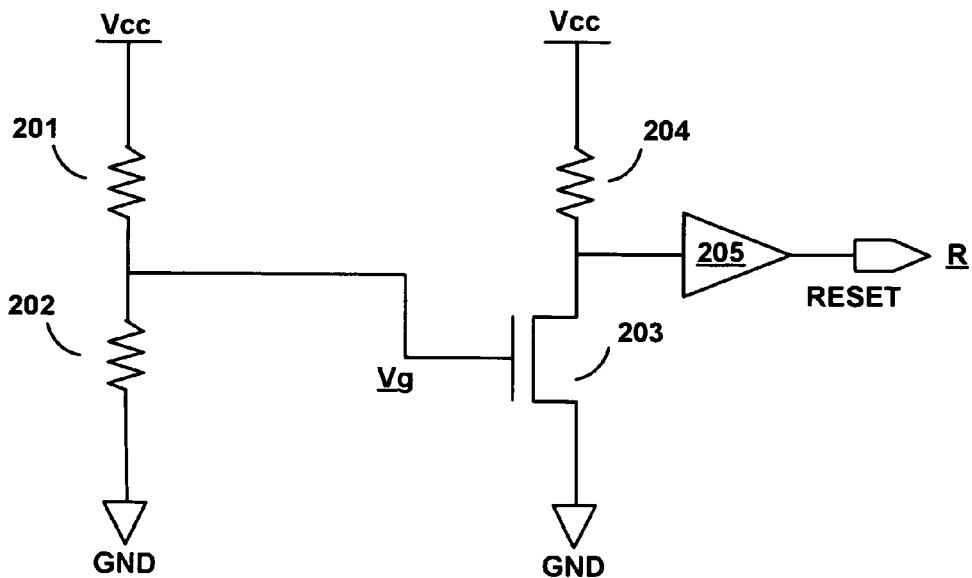
FIG. 2 depicts a conventional reset circuit.

A method and circuit that provide a system level reset function for an electronic device are disclosed. Reference is now made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, techniques, apparatus, etc. have not been described in detail so as not to unnecessarily obscure aspects of the present invention.

Portions of the detailed description that follows are presented and discussed in terms of a process. Although steps and sequencing thereof are disclosed in a figure herein (e.g., FIG. 3) describing the operations of this process (e.g., process 30), such steps and sequencing are exemplary. Embodiments of the present invention are well suited to performing various other steps or variations of the steps recited in the flowchart of the figure herein, and in a sequence other than that depicted and described herein. In one embodiment, such a process is carried out by processors and other electrical and electronic components, e.g., executing computer readable and computer executable instructions comprising code contained in a computer usable medium.

A method and circuit that provide a system level reset function for an electronic device are described herein. In one embodiment, a method provides the system level reset function for the electronic device. An initial reset function is provided under a low voltage condition of supply voltage, such as occur upon first energizing the electronic device. A tunable reset function is provided as well. The tunable reset function can first be asserted at a voltage level setting less precise than that setting becomes upon completing tuning.

A boot-up reset function is provided, along with the initial and tunable reset functions. The voltage level setting at which the boot-up reset function is provided is set according to a calibration, which is based, in one embodiment, on data stored in flash or other non-volatile memory. In one embodiment, the calibration involves a checksum operation. The electronic device, a microcontroller for instance, is held in a reset state with any of the initial, tunable, and boot-up reset functions.

The method and circuit described herein each deter faulty, improper operation of an electronic device. The method and circuit each also deter corruption and damage to the electronic device at unfavorable supply voltages. The method and circuit further each provide these deterrence advantages over a wide range of supply voltage profiles. Therefore, the imprecision and unwanted variation possible in reset voltage levels characteristic of conventional power on reset (POR) approaches are alleviated. Further, attendant problems of unreliable tuning, calibration, and other data important to conventional POR approaches are deterred with the multi-tiered system level reset functions provided by embodiments described herein.

The method and circuit architecture described herein provide a tiered reset scheme that uses overlapping supply voltage monitors, along with a means of precisely tuning the device's reset thresholds. This is done without the risk of the device operating in an unintended manner due to insufficient voltage for proper operation. In one embodiment, this method is well suited to devices such as flash microcontrollers, but is applicable to a variety of other devices as well.

Embodiments of the present invention can be implemented in a variety of electronic devices such as microcontrollers, including flash-based microcontrollers, flash and other non-volatile memory devices and electronic devices incorporating such non-volatile memory devices, application specific integrated circuits (ASIC) and other ICs, etc. In one embodiment, a microcontroller implementing the circuits and methods described herein comprises a programmable microcontroller, such as is described in co-pending U.S. patent application Ser. No. 10/033,027 by Warren Snyder and entitled: Programmable Microcontroller Architecture, which was filed on Oct. 22, 2001, which is incorporated herein by reference in its entirety.

In one embodiment, the circuits and methods described herein are implemented with a microcontroller power on reset (POR) circuit, such as is described in co-pending U.S. patent application Ser. No. 09/887,955 by Harold Kutz, et al. and entitled: Novel Power On Reset Circuit for a Microcontroller, which was filed on Jun. 22, 2001, which is incorporated herein by reference in its entirety. In one embodiment, the circuits and methods described herein are implemented with interaction between a processor and a POR circuit to dynamically control power states in a microcontroller, such as is described in co-pending U.S. patent application Ser. No. 09/887,923 by Harold Kutz, et al. and entitled: Novel Method and System for Interaction Between a Processor and a Power On Reset Circuit to Dynamically Control Power States in a Microcontroller, which was filed on Jun. 22, 2001, which is incorporated herein by reference in its entirety.

Exemplary Method—Providing Tiered Reset

Figure 3:
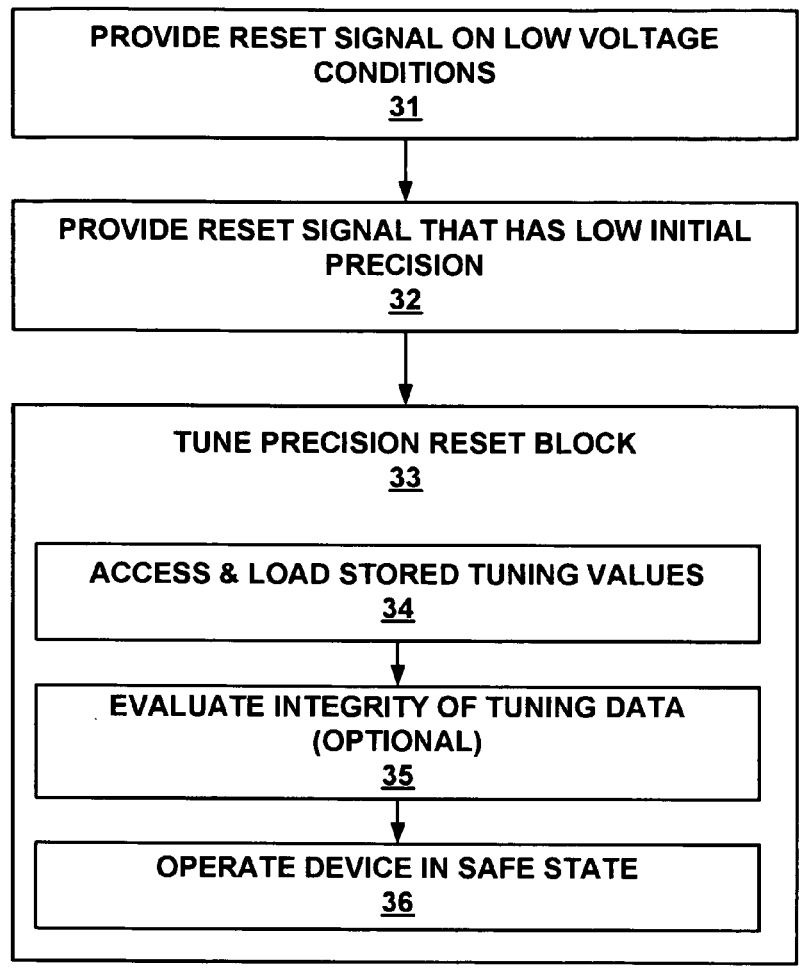
FIG. 3 is a flowchart of an exemplary process for providing reset levels, according to an embodiment of the present invention.

FIG. 3 is a flowchart describing an exemplary process 30 for providing a tiered reset scheme, according to one embodiment of the present invention. Process 30 begins with step 31 wherein a reset signal is provided at low voltage conditions. Step 31 can be executed without high precision. Such precision is not especially significant under such low voltage conditions. For instance, the reset signal so provided is used to initialize the remainder of the device at power-up, and in one embodiment, to provide reset monitoring in the case where all other protection circuitry is disabled, such as where the device is in a sleep mode to save power, upon initially energizing, etc. Thus in one embodiment, this reset signal is provided in response to the assertion of an imprecise voltage detector (e.g., a first voltage monitor).

In step 32, a reset signal is provided that does not have a high initially precise threshold, but which can be adjusted to improve its precision. For instance, this reset signal is provided in one embodiment in response to the assertion of a reset detector that has calibration capability (e.g., a second voltage monitor). This second voltage monitor operates in an initially un-tuned state, so that its reset threshold does not have high initial precision. In the case of a flash microcontroller, tuning values for this block may be stored in the flash or other non-volatile memory during manufacture of the device. In one embodiment, this function is implemented with a comparator that compares the supply voltage (or e.g., a fraction of the supply voltage) to a reference voltage, such as from an internal band-gap voltage circuit.

In step 33, a precision reset block is tuned, which can complete process 30. In one embodiment, the block that is tuned is the second voltage monitor, e.g., used in step 32 to provide a reset signal that can have low initial precision. At device power-up, tuning values held in a non-volatile storage (such as flash memory). In one embodiment, tuning (e.g., step 33) is achieved as described in the following steps.

In step 34, tuning values held in memory are accessed and loaded to temporary storage (such as a register) in order to bring the voltage monitor to the necessary precision. In optional step 35, the integrity of data obtained for tuning is evaluated. In step 36, during the tuning process, the device may operate in a state (e.g., a voltage state) where there is little or no risk of improper operation.

Exemplary Reset Circuit

Figure 4:
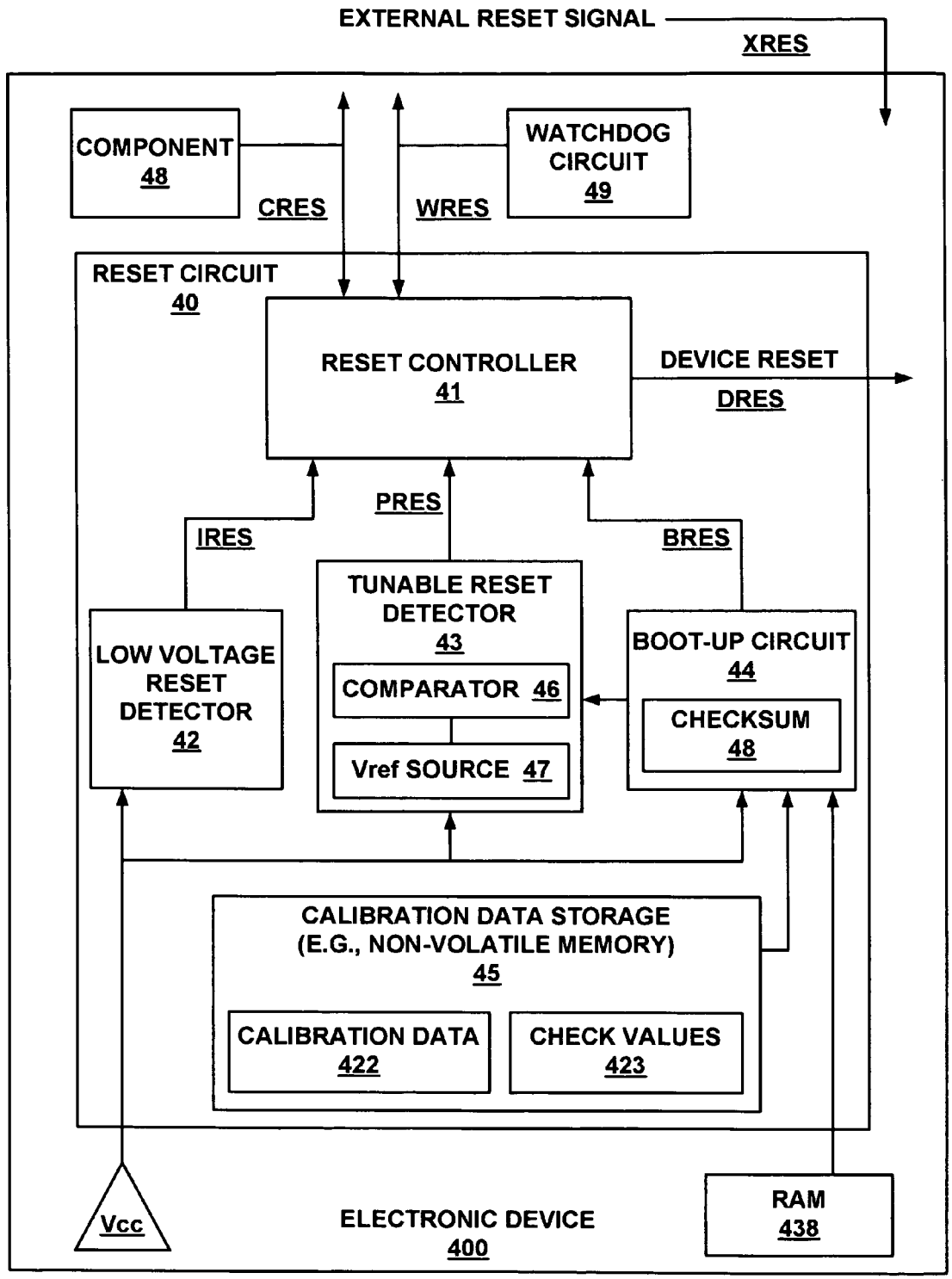
FIG. 4 depicts an exemplary reset system circuit, according to an embodiment of the present invention.

FIG. 4 depicts an exemplary reset system circuit 40, according to an embodiment of the present invention. The present embodiment provides an improved system level reset method and architecture, which is implemented in an electronic device 400, for instance, a microcontroller, a flash memory device, another device having flash or other non-volatile memory, various ICs, etc. System 40 comprises precision means for setting reset levels, wherein electronic device 400 in which reset system 40 is implemented has either sufficient voltage for proper operation, or is held in reset so that harmful operation therein is deterred. Further, reset system 40 provides protection for a variety of voltage ramping profiles during power up, e.g., for most realistic profiles encountered in a variety of electronic devices such as microcontrollers, devices using flash or other non-volatile memory, various ICs, etc.

Reset system 40 has a reset controller 41 that provides a device reset signal DRES to hold an electronic device in a reset state (e.g., "in reset") where a low voltage condition exists, e.g., in its supply voltage Vcc. Reset controller 41 provides the DRES signal on the basis of a tiered reset scheme that uses overlapping supply voltage monitors, along with a means of precisely tuning the device's reset thresholds. Reset controller provides the DRES signal in response to a reset assert signals from any of the tiered, overlapping voltage monitors.

Reset controller provides the device reset signal in response to an initial reset assert signal IRES from a low voltage condition reset detector 42. Low voltage condition reset detector 42 provides the reset assert signal IRES upon detecting that a low voltage condition exists, such as occur in a device such as where the device is in a sleep mode to save power, during a period early upon initially energizing its voltage supply, etc. Reset signal IRES asserts at low supply voltage, and de-asserts once the supply voltage is sufficiently high.

In one embodiment, low voltage condition reset detector 42 does not employ especially high precision detection and response. The trip level for the this block may be relatively imprecisely controlled. Thus, low voltage condition reset detector 42 is referred to herein as an "initial" or "'imprecise' reset detector," although it is to be appreciated that it can be implemented with precision; such precision is less significant under such low voltage conditions. For instance, it is used to initialize the remainder of the device at power-up and in one embodiment, to provide reset monitoring in the case where all other protection circuitry is disabled; e.g., applications wherein imprecise reset assertion suffices. Initializing reset block 42 generates initial reset signal IRES to be used with the device's reset logic (e.g., reset controller 41).

A reset detector block 43 generates a potentially higher precision reset signal PRES. Signal PRES asserts at low supply voltages, until a threshold is crossed at a higher voltage, at which PRES then de-asserts. The circuitry in block 43 may require higher voltages or more operating time than the initial reset block 42, e.g., while establishing a trip point more accurately. However, the initial precision of the block may itself be fairly imprecise. In one embodiment, reset detector block 43 has the ability to be tuned, calibrated, etc.

This capability allows the supply voltage threshold for the PRES signal to be made more precise than upon its initial assertion. In one embodiment implemented for instance in flash microcontrollers, tuning and/or other calibration values 422 are stored in the flash or other non-volatile memory 45, e.g., during manufacture of the device 400. In one embodiment, this calibration function is implemented with a comparator 36 that compares the supply voltage Vcc (or e.g., a fraction of Vcc) to a reference voltage (e.g., Vref), such as from an internal band-gap voltage circuit 37. Thus, reset detector 43 is referred to herein as "tunable."

The boot-up block 44 becomes active once the IRES and PRES signals both de-assert after power-up, e.g., where Vcc has reached a certain threshold level (or e.g., several such levels), higher than the low voltage states at which IRES and/or PRES are asserted. Boot-up block 44 tunes the precision reset circuit 43 to its intended accuracy. This is achieved, in one embodiment, with retrieving and applying calibration values stored in the device.

Boot-up block 44 has means for determining whether the calibration values are valid. Where these calibration values are not valid, a reset signal BRES is asserted. Assertion of signal BRES causes reset controller 41 to generate device reset signal DRES, which leads to a device reset. After passage of some period of time, the boot sequence repeats until the calibration values are determined to be valid. In one embodiment, a checksumming functionality 48 of boot-up block 44 determines whether the calibration values are valid. In the present embodiment, a set of check values 423 are stored along with calibration values stored in non-volatile memory 45. The sum of the calibration values 422 and the check values 423 is configured to add up to a pre-determined value, e.g., a checksum. When the calibration values 422 are accessed from the memory with check values 423, checksum functionality 48 computes their checksum.

Where the configured (e.g., expected) checksum is computed, the calibration test results are satisfactory (e.g., the calibration test is passed). However, where the expected checksum is not obtained, the calibration test is failed. Where the calibration test is failed, the calibration data 422, as received from storage 45, is determined to be faulty. Responsively, boot-up circuit 44 generates the BRES reset assert signal, causing reset controller 41 to assert the device reset signal DRES to hold the electronic device 400 in reset. In one embodiment, calibration, checking, related, and other data can be accessed from and provided to a random access memory (RAM) 438 by boot-up circuit 44.

With valid calibration values applied, the reset threshold is tuned to keep the device in reset until the supply voltage is sufficient for normal operation. Reset controller 41 combines the device reset assert signals IRES, PRES, and/or BRES and distributes appropriate reset signals DRES to the various functionalities in the device. Thus, boot circuit 44 is capable of operating properly at any voltage above the initial uncalibrated trip levels of the reset monitor blocks 42 and 43. In one embodiment, boot circuit 44 comprises logic circuitry and/or components known in the art as capable of operating at lower voltages than more voltage sensitive circuitry, such as flash memory, precision comparators, and similar components, can readily and reliably tolerate.

Other means of providing a reset for a device can be used with reset circuit 40. In one embodiment for instance, other (e.g., external and/or separate, etc.) components and/or co-functional systems may exist that are not shown in this diagram. For example, device 400 can receive an externally generated reset signal XRES and/or a reset signal CRES, generated by another component 48 therein. Further, device 400 can receive a reset signal WRES from a "watchdog" circuit 49 which may assert reset if the circuit does not perform a specified action within a defined period of time. In other embodiments, signals CRES, WRES, and/or XRES can comprise corresponding reset assert signals, which trigger generation of device reset signal DRES from reset controller 41.

Figure 5:
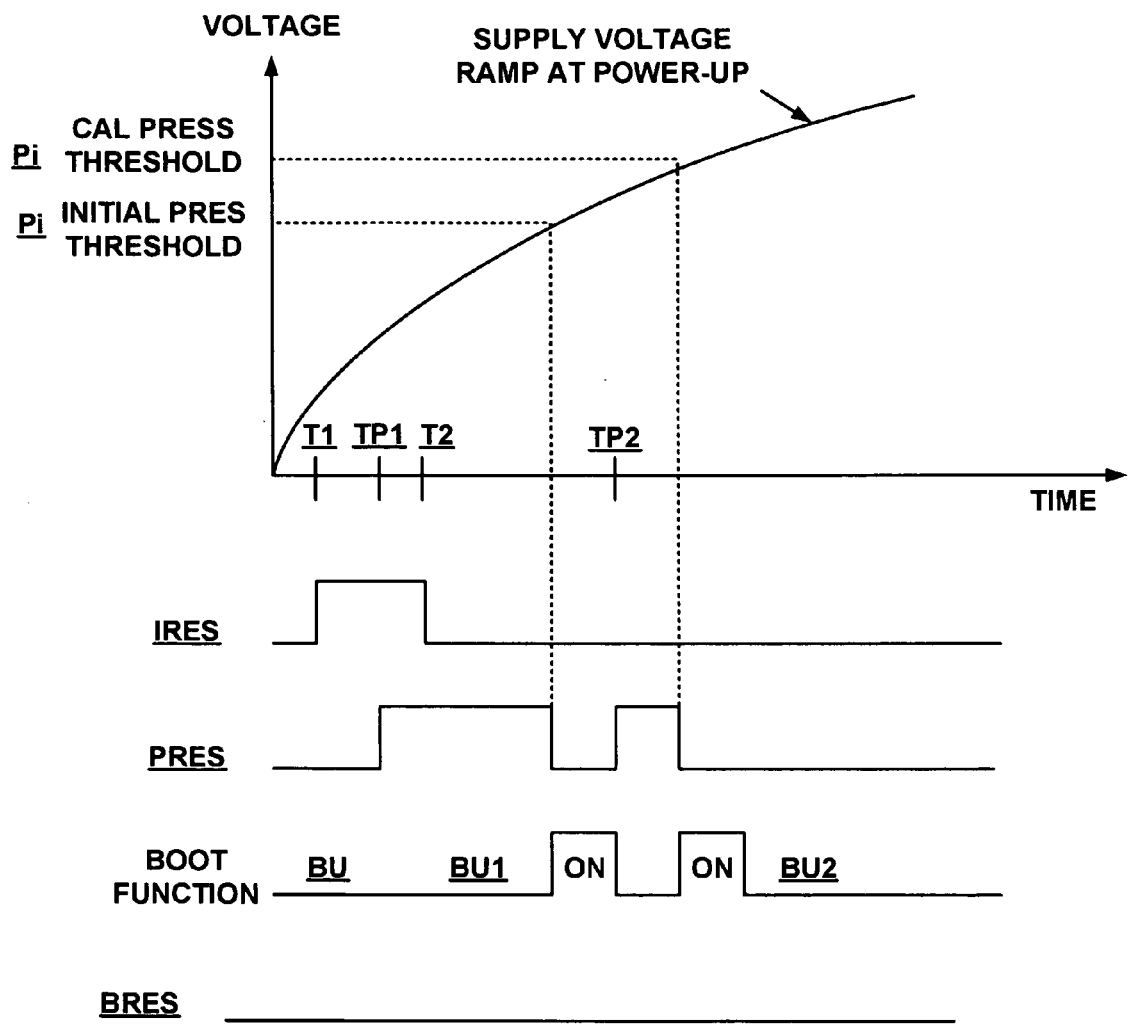
FIG. 5 depicts device operational behavior during an exemplary power-up event, according to an embodiment of the present invention.

FIG. 5 depicts device operational behavior during an exemplary power-up event 50, according to an embodiment of the present invention. In FIG. 5, exemplary power-up event 500 is characterized with voltage as a function of time with corresponding reset assert signals and a boot-up functionality BU. Event 500 depicts behavior exemplary of a device (e.g., electronic device 400; FIG. 4) during a power-up event, as controlled for instance with embodiments described above (e.g., process 30, circuit 40; FIGS. 3, 4, respectively).

Early in exemplary power up event 500 (e.g., from times T1 to T2), a low voltage reset detector (e.g., "imprecise" detector 42; FIG. 4) generates an initial reset assert signal IRES, e.g., while voltage is low. The uncalibrated PRES reset assert signal overlaps the IRES signal beginning at Tp1 (e.g., which is after T1 and before T2). Once both IRES and uncalibrated PRES de-assert, a boot-up function BU1 operates, wherein calibration values are accessed and applied to a precision reset block (e.g., tunable reset detector 43; FIG. 4). PRES initially de-asserts when supply voltage reaches the initial PRES threshold Pi.

In the present embodiment, applying these calibration values moves the voltage threshold for the PRES reset assert signal higher, e.g., to the calibrated PRES threshold Pcal. Thus, PRES signal re-asserts (e.g., at Tp2), because supply voltage has not yet reached this newly calibrated level, Pcal. When the supply voltage rises above the tuned PRES threshold Pcal, the PRES reset assert signal ends, a new boot sequence BU2 occurs (e.g., during and after an earlier boot sequence BU1, Vcc remains below Pcal). BU2 however results in no change here (e.g., no BRES signal is asserted), because PRES has already been calibrated. Thus, the device enters normal operating mode. In one embodiment, under some conditions, the PRES reset assert signal does not reset its calibration value. This may be desirable in certain system applications.

Figure 6:
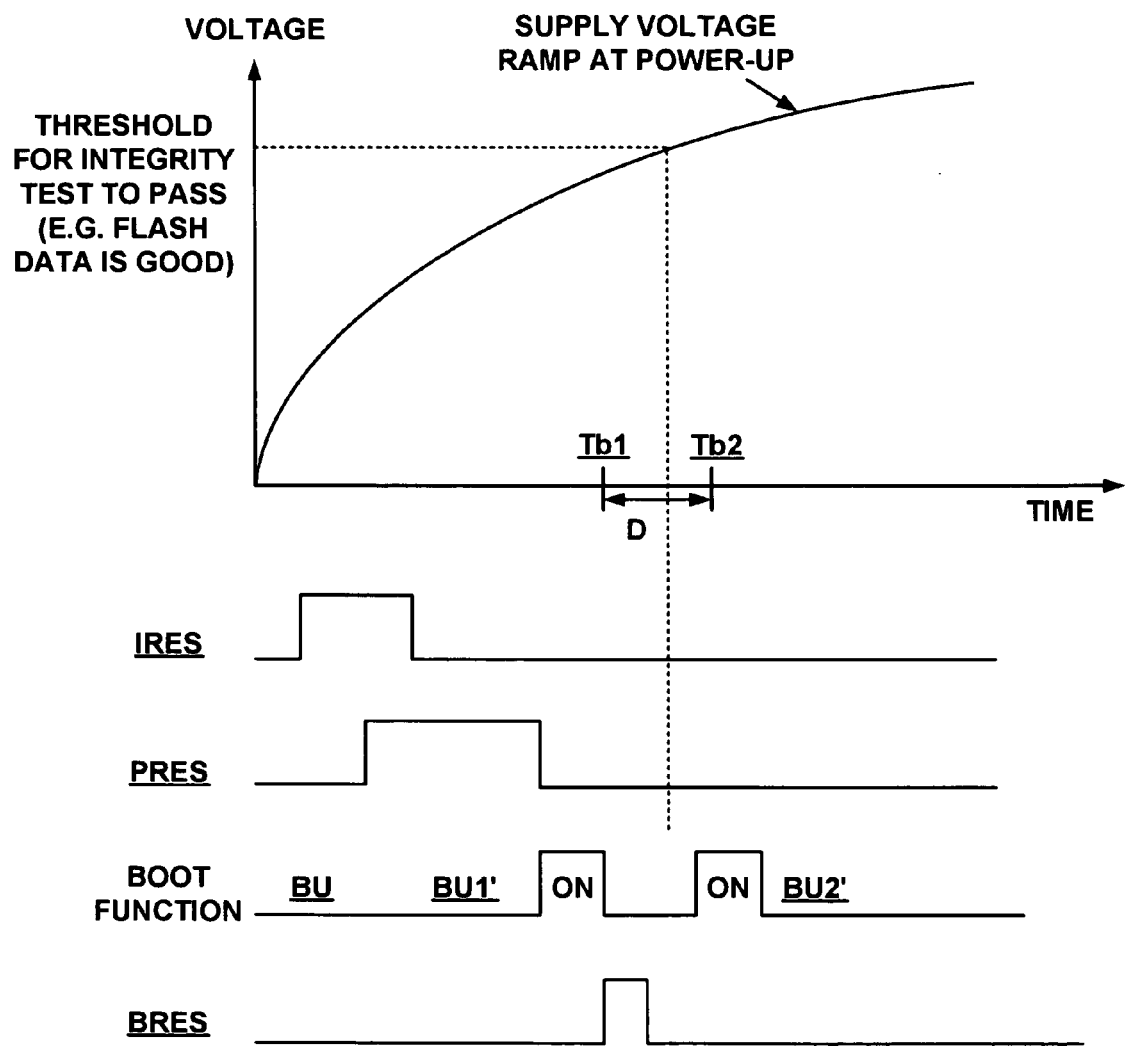
FIG. 6 depicts device operational behavior during an exemplary power-up event wherein calibration data fails a boot-up sequence integrity test, according to an embodiment of the present invention.

FIG. 6 depicts device operational behavior during an exemplary power-up event 600 wherein calibration data fails a boot-up sequence integrity test, according to an embodiment of the present invention. Event 600 thus represents an alternative power-up scenario to event 500 (FIG. 5). In this case, the calibration data fails an integrity test (e.g. checksum) during boot-up sequence BU1'. As a result the BRES signal asserts at time Tb1. After a delay D, the boot sequence repeats at time Tb2 (e.g., a second boot sequence BU2' occurs). In the event shown herein, the second boot-up BU2' passes the data integrity test. Thus, reset assert signal PRES is tuned with the calibrated value. In this case, no subsequent assertion of signal PRES occurs (e.g., as in FIG. 5), although in a more general case PRES may re-assert as shown in FIG. 5. Multiple occurrences of PRES and/or BRES may occur during power up (e.g., or power down, etc.) under various circumstances.

The integrity check during the calibration is significant where the initial precision of the reset blocks that generate IRES and PRES (e.g., reset detectors 42 and 43 respectively; FIG. 4) can possibly allow the device to operate its boot sequence without sufficient supply voltage to do so reliably. This can occur for instance when memory storing data for the calibration function may not output correct values at the voltages then present. This can occur where the operating voltage requirements of such memory are close to the operating voltage requirements of the device, wherein sufficient margin for placing the un-calibrated PRES level to avoid possible errors is not present.

In one embodiment, an exemplary specified device operating supply voltage is 3V and above. In this embodiment, the precision reset level is set to 2.9V or less. This setting helps to avoid undesired, inadvertent, etc. reset on, e.g., a transient supply or similar condition. Some flash memory blocks nominally operate reliably only at voltages above 2.75V. In such a case, the final (e.g., tuned) PRES reset assert level is set between 2.75V and 2.90V. Initially, it is tolerable in one embodiment to set uncalibrated PRES reset assert signal as high as 3.0V.

On initial power-up in this embodiment, the precision achieved for the reset circuitry may be on the order of ±7.5%. In this case, the PRES threshold ranges between approximately 2.60V and 3.0V, effectively a 15% range. Where the initial PRES threshold is approximately 2.60V, the device can be expected to begin its boot operation at a supply voltage between 2.60 and 2.75V. In this range therefore, flash memory output is not entirely reliable.

Where the flash data (e.g., calibration data 422; FIG. 4) is detected as faulty, the boot-up circuit (e.g., boot-up circuit 44; FIG. 4) asserts reset assert signal BRES to reset the device (e.g., by asserting generation of DRES with reset controller 41; FIG. 4). The flash memory data is then re-tested (e.g., as required) until the data passes the integrity test. At that point the precision reset level would be calibrated (e.g. to 2.85V or e.g., another value above 2.75V). Safe device operation is expected once the supply voltage rises above this level. Thus, the accurately calibrated value ensures that the device is either in reset, or has sufficient voltage for proper operation.

Using tiered voltage level reset circuits as described above has a number of advantages. Such precision reset monitor levels can be implemented at low cost and function to avoid the risk of operating a device outside of intended modes. An initially precise reset level is not required. As long as the boot function BU is operable at voltages above the initial reset thresholds (e.g., after time T2), the tiered voltage level schemes described herein configure a device so that it operates with precision reset levels. This is achievable even where elements used in the calibration process (e.g. flash memory) require higher voltages to operate reliably.

Another advantage is that the device may load calibration numbers from internal storage during initialization. The device can monitor the integrity of such settings and assert reset or otherwise restart the calibration process when integrity is suspect. The device implementing these embodiments can be operated safely even in the presence of power up voltage profiles that might otherwise lead to faulty operation. Further, these embodiments allow operating voltages to be safely specified very close to the operating voltage limits of the device's blocks, thus possibly extend the range of device operation, e.g., to lower voltages.

There are several methods for implementing the data integrity function during the boot-up calibration, and another embodiment functions with such a method. In various embodiments, different techniques and/or variations can be used to achieve this result. In one embodiment, a set of additional values are stored along with calibration values stored in non-volatile memory. The sum of the calibration values and the additional values is configured to add up to a pre-determined value, e.g., a checksum. When the calibration values are accessed from the memory, the boot-up block (e.g., boot-up circuit 44; FIG. 4) computes the checksum.

Where the expected checksum is computed, the calibration test results are satisfactory (e.g., the calibration test is passed). However, where the expected checksum is not obtained, the calibration test is failed. Where the calibration test is failed, the calibration data is determined to be faulty and the boot-up circuit responsively resets the device by asserting the BRES reset assert signal (e.g., with causing a reset controller to generate the device reset signal DRES).

Calibration values can thus provide a significant part of an integrity test. In another alternate embodiment, a process to which the checksum conforms can be generated with a varying number of additional values. This provides additional confidence in the data integrity test. In one embodiment, the initial reset circuit and the tunable reset circuit are implemented in a unitary block of circuitry, components, etc. Various wait or delay times are configurable for following an de-assertion of signals IRES, PRES and/or BRES before starting another boot operation.

It should be appreciated that in the description of exemplary embodiments of the invention above, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the appended claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It should be appreciated that reference throughout this specification to "one embodiment" or "an embodiment" means that a particular feature, structure, characteristic, etc. described in connection with the embodiment is included in at least one embodiment of the present invention. Therefore, it is emphasized and should be appreciated that two or more references to "an embodiment" or "one embodiment" or "an alternative embodiment" or "another embodiment" in various portions of this specification are not necessarily all referring to the same embodiment. Furthermore, particular features, structures, characteristics, etc. may be combined as suitable in one or more embodiments of the invention.

In summary, embodiments of the present invention provide a method and circuit for providing a system level reset function for an electronic device, such as a microcontroller.

An initial reset function is provided under a low voltage condition of supply voltage, such as occur upon first energizing the electronic device. A tunable reset function is also provided, which can first be asserted at a voltage level setting less precise than that setting becomes upon tuning. Further, a boot-up reset function is provided, which provides its reset function at a voltage level setting that is set according to a calibration. Calibration is based, in one embodiment, on data stored in flash or other non-volatile memory, and in one embodiment involves a checksum operation. The electronic device is held safely in a reset state with any of the initial, tunable, and boot-up reset functions.

Thus a method and circuit for providing a system level reset function for an electronic device has been described. While the present invention has been described in particular embodiments, it should be appreciated that the present invention should not be construed as limited by such embodiments, but rather construed according to the following claims and their equivalents.

What is claimed is:

1. A method for providing a system level reset function for an electronic device comprising:
   performing a first reset function, operable under a low voltage condition of a supply voltage of said electronic device wherein said low voltage condition characterizes an initial state upon energizing said electronic device;
   performing a second reset function comprising using a tunable monitor of said supply voltage;
   performing a third reset function comprising setting a precision reset level wherein said setting a precision reset level comprises verifying calibration data relating to said precision reset level; and
   holding said electronic device in said system level reset condition responsive to any of said first, said second and said third reset functions.

2. The method as recited in claim 1 wherein said second reset function is operable under a voltage condition of said supply voltage subsequent to said low voltage condition and wherein said subsequent voltage condition has a voltage greater in magnitude to said low voltage condition.

3. The method as recited in claim 1 wherein said first and said second reset functions are performed by a common component of said electronic device.

4. The method as recited in claim 1 wherein said second reset function further comprises:
   a first level of voltage based triggering; and
   a second level of voltage based triggering wherein said second level has a voltage sensitivity precision greater than that of said first level of voltage based triggering.

5. The method as recited in claim 1 wherein said first, said second, and said third reset functions each comprise monitoring said supply voltage.

6. The method as recited in claim 1 wherein said setting a precision reset level further comprises:
   upon determining that said calibration data is valid, calibrating said third reset function by setting a value of voltage sensitivity for said third reset function; and
   upon sensing that said supply voltage has a voltage state corresponding to said reset value, performing said third reset function.

7. The method as recited in claim 6 further comprising, upon sensing that said supply voltage has a voltage state having a magnitude greater than said reset value, halting said system level reset function.

8. The method as recited in claim 6 wherein said verifying comprises:
   accessing said calibration data, wherein said accessing comprises retrieving said calibration data from a storage functionality; and
   validating said calibration data.

9. The method as recited in claim 8 wherein said validating comprises:
   accessing checking information retrieved from said storage functionality;
   comparing said calibration data with said checking data;
   determining that said calibration data is correct, wherein said comparing and said determining comprise a checksum operation; and
   where said calibration data is found to be faulty:
      holding said electronic device in said system level reset condition; and
      repeating said determining.

10. The method as recited in claim 1 wherein said electronic device comprises a microcontroller.

11. A circuit for providing a system level reset function for an electronic device having a supply voltage comprising:
   a reset controller for generating a reset signal to hold said electronic device in a reset state;
   a first reset detector coupled to said reset controller for supplying a first reset assert signal thereto;
   a second reset detector coupled to said reset controller for triggering a second reset assert signal thereto;
   a third reset detector coupled to said reset controller for supplying a third reset assert signal thereto and for calibrating a level of voltage sensitivity for triggering said second reset assert signal wherein said reset controller supplies said reset signal responsive to any of said first, said second, and said third reset assert signals; and
   a storage functionality coupled to said third reset detector and providing data thereto relating to said calibrating.

12. The circuit as recited in claim 11 wherein said first reset detector supplies said first reset assert signal under a low voltage condition of said supply voltage of said electronic device and wherein said low voltage condition characterizes an initial state of said electronic device.

13. The circuit as recited in claim 11 wherein said second reset assert signal is supplied under a voltage condition of said supply voltage subsequent to said low voltage condition, wherein said subsequent voltage condition has a level greater in magnitude to said low voltage condition, and wherein said second reset detector is tunable for setting a voltage level for triggering said second reset assert signal with a precision of voltage sensitivity greater than an initial sensitivity thereof.

14. The circuit as recited in claim 13 wherein said second reset detector comprises:
   a reference voltage source for supplying a reference voltage when said supply voltage is at a level greater than said low voltage condition; and
   a comparator coupled to said reference voltage source, for comparing said supply voltage to said reference voltage and for performing said triggering based on results of said comparing.

15. The circuit as recited in claim 11 wherein said calibrating comprises:
   verifying calibration data; and
   upon determining that said calibration data is valid, setting a value for triggering said second reset function corresponding to said calibration data.

16. The circuit as recited in claim 15 wherein said storage functionality stores said calibration data and values for checking said calibration data and wherein said verifying comprises:

retrieving said calibration data and said checking data; and performing a checksum operation therewith.

17. The circuit as recited in claim 11 wherein said electronic device comprises a microcontroller and wherein said storage functionality comprises non-volatile memory.

18. A method for providing a system level reset function for an electronic device comprising:

in response to sensing a first voltage state of a supply voltage for said electronic device corresponding to an initial operating state of said electronic device, performing an initial rest function wherein said initial reset function holds said electronic device in a reset state;

monitoring said supply voltage;

upon determining that said supply voltage has a second voltage state having a magnitude greater than a minimum voltage, performing the following:

verifying calibration data; and performing a second reset function that holds said electronic device in a reset state;

upon determining that said calibration data is valid, calibrating said second reset function by setting a reset value; and upon sensing that said supply voltage has a voltage state corresponding to said reset value:

performing a third reset function to hold said electronic device in a reset state; and upon sensing that said supply voltage has a voltage state having a magnitude greater than said reset value, halting said system level reset function.

19. The method as recited in claim 18 wherein said second reset function is tunable for adjusting a voltage level of said supply voltage at which said second rest function is triggered and wherein said second reset function is triggered initially with a voltage sensitivity less precise than upon said adjusting.

20. The method as recited in claim 18 wherein calibrating comprises:

verifying calibration data; and upon determining that said calibration data is valid, setting a value for triggering said third reset function corresponding to said calibration data, wherein said electronic device comprises a microcontroller.

* * * * *